United States Patent
Fowler et al.

(10) Patent No.: US 6,831,849 B2
(45) Date of Patent: Dec. 14, 2004

(54) CONVERSION OF SINGLE PHASE TO MULTIPLE PHASE ALTERNATING CURRENT

(75) Inventors: Craig Rae Fowler, Caen (FR); Dennis A. Kramer, Troy, MI (US); Jerome Quere, Bieville-Beuville (FR); Enrico Fin, Lake Orion, MI (US); George Chene, Sterling Heights, MI (US); Stephen Chiu, Thousand Oaks, CA (US); Pascal Garrido, Kilworthy (CA); Ira B. Goldberg, Thousand Oaks, CA (US); Charles Hopson, Lebanon, TN (US); David M. Barry, Stratford Upon Avon (GB); Dan Rogovin, Newbury Park, CA (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 116 days.

(21) Appl. No.: 09/832,677

(22) Filed: Apr. 11, 2001

(65) Prior Publication Data

US 2002/0149956 A1 Oct. 17, 2002

(51) Int. Cl.⁷ ............................ H02M 5/00; H02M 5/45
(52) U.S. Cl. ......................................... 363/148; 363/36
(58) Field of Search ........................ 363/148.132, 127, 363/36, 37, 49, 39, 151, 156; 318/767, 798, 768, 738, 771

(56) References Cited

U.S. PATENT DOCUMENTS

| | | | |
|---|---|---|---|
| 3,809,980 A | | 5/1974 | Nottingham |
| 4,520,303 A | * | 5/1985 | Ward .......................... 318/778 |
| 4,644,241 A | * | 2/1987 | Maeda ........................ 318/768 |
| 4,745,348 A | * | 5/1988 | Young ......................... 318/749 |
| 4,802,079 A | * | 1/1989 | Mizoguchi .................... 363/71 |
| 5,187,654 A | | 2/1993 | Felippe |
| 5,198,971 A | * | 3/1993 | Recker et al. ................. 363/71 |
| 5,272,616 A | * | 12/1993 | Divan et al. ................. 363/148 |
| 5,341,075 A | * | 8/1994 | Cocconi ....................... 307/66 |
| 5,545,965 A | | 8/1996 | Smith |
| 6,051,952 A | * | 4/2000 | Moreira et al. ............. 318/738 |
| 6,058,032 A | * | 5/2000 | Yamanaka et al. ............ 363/71 |
| 6,242,883 B1 | * | 6/2001 | Strunk ......................... 318/767 |

* cited by examiner

Primary Examiner—Rajnikant B. Patel
(74) Attorney, Agent, or Firm—Carlson, Gaskey & Olds

(57) ABSTRACT

A system for controlling multiple vehicle includes a twelve volt (12V)/forty-two volt (42V) battery power distribution system that provides direct current. The system converts single phase alternating current to multiple phase alternating current to simultaneously power multiple vehicle systems. A single pulse width modulation generator converts the direct current from the 12V/42V battery power distribution system to alternating current. This provides one power supply path of alternating current, which has a first phase. A splitter device splits the one power supply path of alternating current into three power paths. A lead/lag circuit is used to shift the alternating current of the second path to a second phase different than the first phase of the first power supply path. A second lead/lag circuit for shifts the alternating current of the third path to a third phase different than the first phase or the second phase. This creates a three-phase alternating current power from a single direct current source. The three-phase alternating current is used to power a plurality of induction motors that operate multiple vehicle systems.

21 Claims, 1 Drawing Sheet

CONVERSION OF SINGLE PHASE TO MULTIPLE PHASE ALTERNATING CURRENT

BACKGROUND OF THE INVENTION

This invention relates to a method and apparatus for utilizing a forty-two volt (42 V) power distribution system (42 V alternator, 36 V battery) to control multiple vehicle motors by converting single phase alternating current to three-phase alternating current.

As more electrically controlled devices are incorporated into vehicles, the power supply for running these devices must also be increased. The standard twelve volt (12V) battery with a fourteen volt (14V) alternator that has traditionally been installed within the vehicle does not provide sufficient power to meet the increased demands.

To meet the demand for an increased power supply, the automotive industry is moving towards a thirty-six volt (36V)/forty-two volt (42V) alternator system. As this transition is made, hybrid systems that can support both voltages are needed. These hybrid systems are referred to as a twelve volt (12V)/thirty-six volt (36V) battery power distribution system or a fourteen volt (14V)/forty-two volt (42V) power distribution system. The use of a 36V/42V system permits the use of electrical components that could not previously be used in 12V/14V systems. The 36V/42V system provides direct current (DC) to power DC motors that run the various vehicle actuation systems such as window regulators, sunroofs, power locks, power mirrors, power seats, etc.

In a 36V/42V power system, there is sufficient power to use alternating current (AC) induction motors for running the various actuation systems in a vehicle. AC induction motors require at least single-phase AC power (for single-phase induction motors); however, to operate efficiently and smoothly, three-phase Ac power is preferred (for three-phase induction motors). Thus, the use of AC induction motors requires conversion of the direct current power supply to three-phase alternating current. Typically, direct current is converted to three-phase alternating current by at least six (6) power switches and multiple wires leading into the power converter. This requires a complex circuit that is expensive.

On the other hand, conversion of direct current into single-phase alternating current can be performed simply by two (2) power switches. Thus it is desirable to provide a low-cost method and apparatus for converting single phase alternating current to three-phase alternating current to power induction motors without additional power switches.

SUMMARY OF THE INVENTION

A system for converting single phase alternating current produced by pulse width modulation to three-phase alternating current, uses lead/lag circuits to produce the phase shifts. The direct current source is provided by a twelve volt (12V)/thirty-six volt (36V) power distribution systems. This configuration permits the use of induction motors for operating vehicle systems such as power seats, power windows, door locks, etc., for example. Induction motors increase reliability and accuracy for overall improved system performance.

The method for converting single phase alternating current to multiple phase alternating current to simultaneously power multiple vehicle systems includes the following steps. Single phase alternating current is produced from a direct current source with pulse width modulation. The single phase alternating current is split into a plurality of separate paths including at least a first path, a second path, and a third path. The phase of the alternating current on the second path is shifted to a different phase than the phase of the first path. The phase of the alternating current on the third path is shifted to a different phase than the phase first or second paths to create three-phase alternating current power. Multiple vehicle systems are operated by the three-phase alternating current power.

In a disclosed embodiment of this invention, the system for converting single phase alternating current to multiple phase alternating current to simultaneously power multiple vehicle systems includes a direct current source and a single pulse width modulation generator for converting direct current to alternating current. This provides one power supply path of alternating current having a first phase. A splitter splits the one power supply path of alternating current into a plurality of power supply paths including at least a first power supply path, a second power supply path, and a third power supply path. At least one lead/lag circuit shifts the alternating current of the second path to a second phase different than the first phase of the first power supply path and at least one lead/lag circuit shifts the alternating current of the third path to a third phase different than the first phase or the second phase. A plurality of induction motors operates multiple vehicle systems via a three-phase alternating current power comprised of the first, second, and third paths.

This configuration provides a simplified and inexpensive means of converting direct current from a 36V power supply to three-phase alternating current power for operating induction motors. The induction motors operate efficiently and reliably to improve the performance of the respective vehicle system.

These and other features of the present invention can be best understood from the following specification and drawings, the following of which is a brief description.

DETAILED DESCRIPTION OF THE PREFERRED EMBODIMENT

Figure 1:
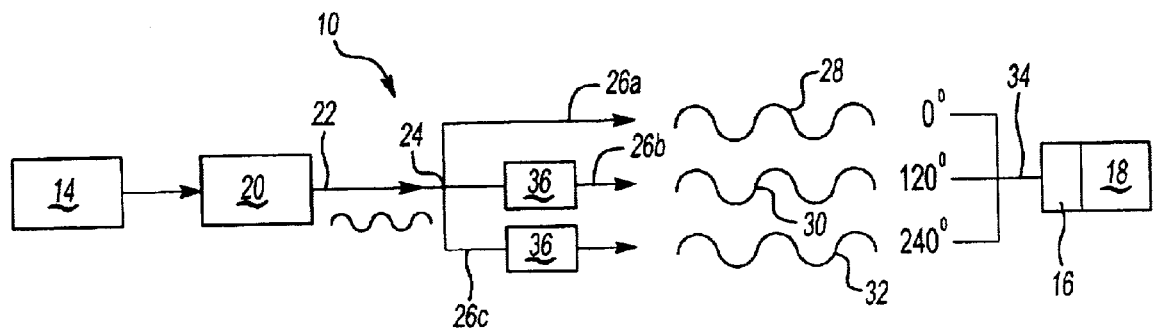
FIG. 1 is a schematic diagram incorporating the subject invention.

A system for converting single phase alternating current into three-phase alternating current is shown schematically at 10 in FIG. 1. The system 10 has a twelve volt (12V)/thirty-six volt (36V) battery power distribution system. The operation of batteries is well known in the art and thus will not be discussed in detail. The system 10 provides 12V power for vehicle operations that have traditionally required 12V power and provides 36V power for additional vehicle systems that require more power to operate accurately and efficiently. The 12V/36V system provides direct current (DC) that is converted to alternating current (AC) to power induction motors 16 that run various vehicle operating systems 18 such as window regulators, sunroofs, power locks, power mirrors, power seats, etc., for example.

A converter 20 comprised of a pulse width modulation (PWM) generator produces single phase alternating current 22 from a direct current source 14. A splitter 24 splits the single phase alternating current 22 into a plurality of separate alternating current paths including a first path 26a, a second path 26b, and a third path 26c. The first path 26a has a first phase 28 that is equivalent to the single phase alternating current 22. The second path 26b is shifted to a second phase 30 of alternating current that is different than the first phase 28. The third path 26c is shifted to a third phase 32 of alternating current that is different than the first 28 or second 30 phases. This creates three-phase alternating current power 34 that is used to operate induction motors 16 for the multiple vehicle systems 18.

Figure 2:
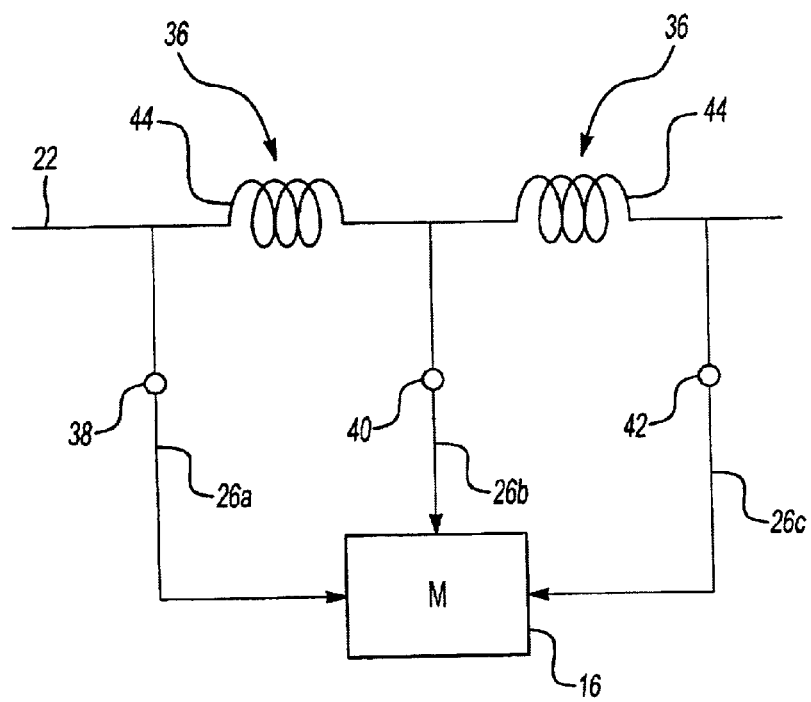
FIG. 2 is a schematic diagram depicting one embodiment of the invention incorporated into a vehicle system.

The shifting of the second 30 and third 32 phases is accomplished with analog lead/lag circuits 36. The operation of lead lag circuits is well known. In one embodiment, shown in FIG. 2, the single phase alternating current 22 is provided by a single wire that is tapped into at three (3) different locations. A first tap 38 is made into the single wire before phase shifting occurs, a second tap 40 occurs after the first phase shift, and a third tap 42 occurs after the second phase shift. The phase shifts are initiated by inductors 44 placed between the first 38 and second 40 taps and between the second 40 and third 42 taps. The inductors 44 create a time delay between the currents at each location, which results in the subsequent phase shift. The three-phase alternating current 34 is then supplied to the induction motor 16 to run the appropriate vehicle system 18.

Preferably, the second phase 30 is shifted by approximately one hundred and twenty degrees (120°) compared to the first phase 28 and the third phase 32 is shifted by approximately one hundred and twenty degrees (120°) compared to the second phase 30. In the preferred embodiment, the first phase 28 is maintained at approximately a zero degrees (0°) phase shift, the second phase 30 is maintained at approximately a one hundred and twenty degrees (120°) phase shift, and the third phase 32 is maintained at approximately a two hundred and forty degrees (240°) phase shift.

By generating only a single phase alternating current by pulse width modulation and converting the single phase into a three-phase alternating current, the number of wires leading out of the power converter is significantly reduced. Further, the number of for power switches is minimized. This significantly reduces the cost and makes the use of induction motors for operating vehicle systems much more economical.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A method for converting single phase alternating current to multiple phase alternating current for simultaneously powering multiple vehicle systems comprising the steps of:
    (a) producing single phase alternating current from a direct current source with pulse width modulation;
    (b) splitting the single phase alternating current into a plurality of separate paths including at least a first path, a second path, and a third path;
    (c) shifting the phase of the alternating current on the second path to be different than the phase of the first path and shifting the phase of the alternating current on the third path to be different than the phase of the first or second paths to create three-phase alternating current power; and
    (d) operating vehicle systems with the three-phase alternating current power.

2. A method as recited in claim 1, wherein step (c) further includes shifting the phase of the alternating current for the second and third paths with lead/lag circuits.

3. A method as recited in claim 1, wherein step (b) is further defined as splitting the single phase alternating current into only three separate paths comprised of the first path, the second path, and the third path.

4. A method as recited in claim 3, wherein step (c) is further defined as maintaining the first path at a first phase corresponding to the phase of the single phase alternating current, shifting the single phase alternating current of the second path to a second phase different than the first phase, and shifting the single phase alternating current of the third path to a third phase different than the first or second phases.

5. A method as recited in claim 4 including the steps of shifting the second phase by approximately one hundred and twenty degrees (120°) compared to the first phase and shifting the third phase by approximately one hundred and twenty degrees (120°) compared to the second phase.

6. A method as recited in claim 5 including the steps of maintaining the first phase at approximately a zero degrees (0°) phase shift, maintaining the second phase at approximately a one hundred and twenty degrees (120°) phase shift, and maintaining the third phase at approximately a two hundred and forty degrees (240°) phase shift.

7. A method as recited in claim 1, wherein step (a) further includes producing single phase alternating current from a thirty-six volt (36V) battery power system.

8. A method as recited in claim 7 wherein step (b) further includes providing a single line for the single phase alternating current and tapping into the this same line at three different locations to create the first path, the second path, and the third path.

9. A method as recited in claim 8 wherein step (c) further includes shifting the phase of the alternating current for the second and third paths with inductors placed between the first and second paths on the single line and between the second and third paths on the single line.

10. A system for converting single phase alternating current to multiple phase alternating current to simultaneously power multiple vehicle systems comprising:
    a direct current source;
    a single pulse width modulation generator for converting direct current to alternating current to provide one power supply path of alternating current having a first phase;
    a splitter for splitting said one power supply path of alternating current into a plurality of power supply paths including at least a first power supply path, a second power supply path, and a third power supply path;
    at least one lead/lag circuit for shifting the alternating current of said second path to a second phase different than said first phase of said first power supply path;
    at least one lead/lag circuit for shifting the alternating current of said third path to a third phase different than said first phase or said second phase; and
    a plurality of induction motors for operating multiple vehicle systems via a three-phase alternating current power comprised of said first, second, and third paths.

11. A system as recited in claim 10, wherein said direct current source is a thirty-six volt (36V) battery power distribution system.

12. A system as recited in claim 11, wherein the second phase is shifted by approximately one hundred and twenty degrees (120°) compared to the first phase and the third phase is shifted by approximately one hundred and twenty degrees (120°) compared to the second phase.

13. A system as recited in claim 12, wherein the first phase is maintained at approximately a zero degrees (0°) phase shift, the second phase is maintained at approximately a one hundred and twenty degrees (120°) phase shift, and the third phase is maintained at approximately a two hundred and forty degrees (240°) phase shift to provide the three-phase alternating current power.

14. A method as recited in claim 1 including the step of generating direct current from a vehicle battery power distribution system prior to step (a).

15. A method as recited in claim 14 including the step of simultaneously providing twelve volt and thirty-six volt power from the vehicle battery power distribution system.

16. A method as recited in claim 1 wherein step (d) further includes using three-phase alternating current to power a plurality of induction motors for operating a plurality of vehicle systems including at least one of a power window closure, power seat, power lock, or power mirror system.

17. A method as recited in claim 1 including the step of using direct current and alternating current from a common vehicle battery power distribution system to operate vehicle systems.

18. A system as recited in claim 10 including a vehicle battery power distribution system including twelve volt and thirty-six volt power.

19. A system as recited in claim 18 wherein said vehicle battery power distribution system utilizes three-phase alternating current and direct current to power a plurality of different vehicle systems.

20. A system as recited in claim 18 wherein said vehicle systems include at least one of a power window closure, power seat, power lock, or power mirror system.

21. A method as recited in claim 1 wherein step (a) further includes using a single pulse width modulation generator to provide one power supply path of alternating current.

* * * * *